(12) United States Patent
Huang et al.

(10) Patent No.: US 10,320,509 B2
(45) Date of Patent: Jun. 11, 2019

(54) FAIL SAFE CLOCK BUFFER AND CLOCK GENERATOR

(71) Applicant: Silicon Laboratories Inc., Austin, TX (US)

(72) Inventors: Yunteng Huang, Palo Alto, CA (US); Adam B. Eldredge, Frisco, TX (US); Gregory J. Richmond, Cupertino, CA (US)

(73) Assignee: Silicon Laboratories Inc., Austin, TX (US)

( * ) Notice: Subject to any disclaimer, the term of this patent is extended or adjusted under 35 U.S.C. 154(b) by 330 days.

(21) Appl. No.: 14/980,036

(22) Filed: Dec. 28, 2015

(65) Prior Publication Data
US 2017/0187481 A1    Jun. 29, 2017

(51) Int. Cl.
| | |
|---|---|
| *H04L 7/033* | (2006.01) |
| *H04J 3/14* | (2006.01) |
| *H04L 12/24* | (2006.01) |
| *H04J 3/06* | (2006.01) |

(52) U.S. Cl.
CPC ............ *H04J 3/14* (2013.01); *H04J 3/0691* (2013.01); *H04L 7/0331* (2013.01); *H04L 41/0672* (2013.01)

(58) Field of Classification Search
None
See application file for complete search history.

(56) References Cited

U.S. PATENT DOCUMENTS

| | | | | |
|---|---|---|---|---|
| 5,767,747 A | * | 6/1998 | Pricer | ............. H03B 5/20 327/291 |
| 6,836,166 B2 | * | 12/2004 | Lin | ............. G11C 7/1072 327/158 |
| 7,405,628 B2 | | 7/2008 | Hulfachor et al. | |
| 7,777,585 B1 | | 8/2010 | Sonntag | |
| 8,531,246 B2 | | 9/2013 | Huang | |
| 8,692,599 B2 | | 4/2014 | Gong et al. | |
| 8,786,341 B1 | | 7/2014 | Weltin-Wu et al. | |

(Continued)

OTHER PUBLICATIONS

NB 84092640, Majority Logic, Fail Safe Clock Generation, IBM Technical Disclosure Bulletin, Sep. 1, 1984, pp. 1-2 (Year: 1984).*

(Continued)

*Primary Examiner* — Phuongchau Ba Nguyen
(74) *Attorney, Agent, or Firm* — Zagorin Cave LLP

(57) ABSTRACT

Techniques for generating a fail safe clock signal improves reliability of one or more output clock signals generated based on one or more input clock signals and an internally generated reference clock signal. By continuously monitoring the frequencies of the one or more input clock signals and reducing or eliminating effects of any static frequency offset between multiple input clock signals, the fail safe clock generator can detect very small relative frequency changes between the inputs or within a particular input. By comparing the input clock frequencies against a reference clock signal frequency over time of a clock signal generated by an internal oscillator, the fail safe clock generator may further detect which one of multiple input clocks has frequency deviation. The fail safe clock generator uses an internal oscillator generating a reference clock signal having a short-term stable frequency.

20 Claims, 5 Drawing Sheets

(56)  References Cited

U.S. PATENT DOCUMENTS

| | | | |
|---|---|---|---|
| 2005/0174271 A1* | 8/2005 | Carley | H03M 5/08 |
| | | | 341/100 |
| 2006/0170482 A1* | 8/2006 | Carley | H03K 5/133 |
| | | | 327/396 |
| 2014/0118033 A1 | 5/2014 | Anker et al. | |

OTHER PUBLICATIONS

Silicon Laboratories, "SYNCE and IEEE 1588: Sync Distribution fora Unified Network," AN420, Rev. 1.0, Jul. 2014, pp. 1-16.
Silicon Laboratories, "Synchronous Ethernet/Telecom Jitter Attenuating Clock Multiplier," Si5315, Rev. 1.0, Apr. 2012, pp. 15-16.

* cited by examiner

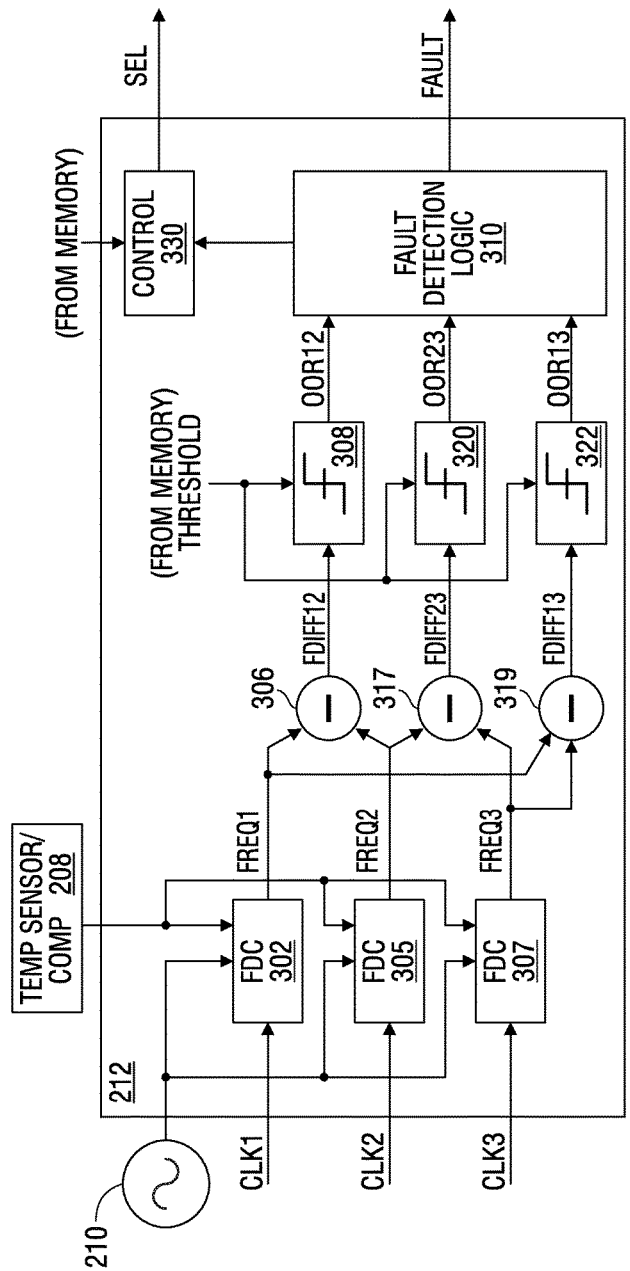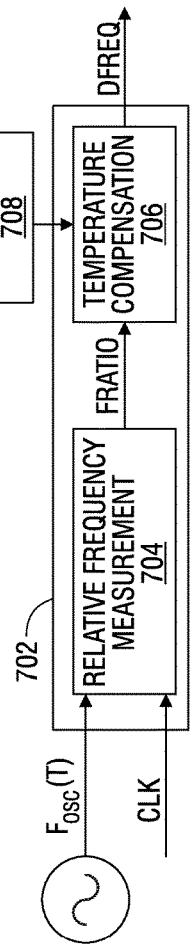

FAIL SAFE CLOCK BUFFER AND CLOCK GENERATOR

BACKGROUND

Field of the Invention

This invention relates to electronic devices and more particularly to generating clock signals for electronic devices.

Description of the Related Art

Services associated with modern communications networks may require accurate and stable frequency and phase to operate properly. A typical line card provides an interface for supporting communication between a service and the rest of the network. The line card may provide frequency synthesis and jitter attenuation based on a received standard-accurate clock signal (e.g., a Network Time Protocol time source for stratum 2 or stratum 3 synchronization) or from other external clock source (e.g., crystal oscillators) to generate one or more local clock signals having high frequency accuracy. Line cards compliant with standards such as Ethernet, Synchronous Optical Network (SONET), Synchronous Digital Hierarchy (SDH) (the European counterpart to SONET), or Synchronous Ethernet utilize clock generation circuits to generate local clock signals used in data transmission and reception and other applications.

Rather than use individual frequency control devices (crystals) for many of the subsystems, a single frequency controlled source is used. Loss of the received input clock signal (i.e., loss-of-signal (LOS)) or a sudden change in frequency of the received input clock signal (i.e., out-of-range (OOR), e.g., 1 part-per-million per second (ppm/s)) may cause catastrophic system failure from which it is difficult or impossible for a system to recover or even diagnose. Accordingly, fail safe clock buffer and clock generator techniques are desired.

SUMMARY OF EMBODIMENTS OF THE INVENTION

In at least one embodiment of the invention, a fail safe clock generator includes an oscillator circuit configured to generate a clock signal having a short-term stable reference frequency (e.g., stable for a few seconds). The fail safe clock generator includes a monitor circuit including a frequency-to-digital converter configured to generate a first digital frequency value representing a first frequency of a first input clock signal relative to the short-term stable reference frequency. The monitor circuit includes a logic circuit configured to generate a fault detection signal based on a difference between the first digital frequency value and a second digital frequency value. The second digital frequency value may be a prior first digital frequency value. The monitor circuit may include a second frequency-to-digital converter configured to generate the second digital frequency value representing a second frequency of a second input clock signal relative to the short-term stable reference frequency. The fail safe clock generator may include a third frequency-to-digital converter configured to generate a third digital frequency value representing a third frequency of a third input clock signal relative to the short-term stable reference frequency. The fault detection signal may be further based on the third digital frequency value. The monitor circuit may include a temperature compensation circuit configured to temperature compensate a relative frequency measurement of the first frequency of the first input clock signal relative to the short-term stable reference frequency based on a digital sensed temperature and predetermined temperature coefficients describing a relationship between temperature and a corresponding frequency of the clock signal. The oscillator circuit may be a temperature-compensated LC oscillator including a passive temperature compensation circuit configured to provide compensation to the temperature-compensated LC oscillator in response to a temperature change.

In at least one embodiment of the invention, a method includes generating a clock signal having a short-term stable reference frequency and generating a first digital frequency value representing a first frequency of a first input clock signal relative to the short-term stable reference frequency. The method includes generating a fault detection signal based on a difference between the first digital frequency value and a second digital frequency value. The method may include providing a prior first digital frequency value as the second digital frequency value. The method may include generating the second digital frequency value representing a second frequency of a second input clock signal relative to the short-term stable reference frequency. The method may include sensing a temperature of an LC oscillator used to generate the clock signal and passively compensating for variations due to changes in the temperature of the LC oscillator and the generating the clock signal having the short-term stable reference frequency uses the LC oscillator. The method may include sensing a temperature of an oscillator used to generate the clock signal. Generating the first digital frequency value may include compensating a relative frequency measurement of the first frequency of the first input clock signal relative to the short-term stable reference frequency based on the temperature and predetermined temperature coefficients describing a relationship between temperature and a corresponding frequency of the clock signal

BRIEF DESCRIPTION OF THE DRAWINGS

The present invention may be better understood, and its numerous objects, features, and advantages made apparent to those skilled in the art by referencing the accompanying drawings.

FIG. 5 illustrates a functional block diagram of a portion of monitor circuitry of FIG. 4 generating fault information based on more than two external input clock signals consistent with at least one embodiment of the invention.

FIG. 7 illustrates a functional block diagram of an exemplary frequency-to-digital converter of the monitor circuitry of FIGS. 2, 3, and 5 consistent with at least one embodiment of the invention.

The use of the same reference symbols in different drawings indicates similar or identical items.

DETAILED DESCRIPTION

A fail safe clock generator improves reliability of one or more output clock signals generated based on one or more input clock signals and an internally generated reference clock signal. By continuously monitoring the frequencies of the one or more input clock signals and reducing or eliminating effects of any static frequency offset between multiple input clock signals, the fail safe clock generator can detect very small relative frequency changes between the inputs or within a particular input. By comparing the input clock frequencies against a reference clock signal frequency over time of a clock signal generated by an internal oscillator, the fail safe clock generator may further detect which one of multiple input clocks has frequency deviation and may cause the clock generator to switch to a backup input clock signal accordingly. The fail safe clock generator uses an internal oscillator generating a reference clock signal having a short-term stable frequency. The internal oscillator may include passive and active temperature compensation. In at least one embodiment, using a temperature sensor and providing temperature compensation to the monitor circuit based on sensed temperature further improves the accuracy of the frequency deviation detection.

Figure 1:
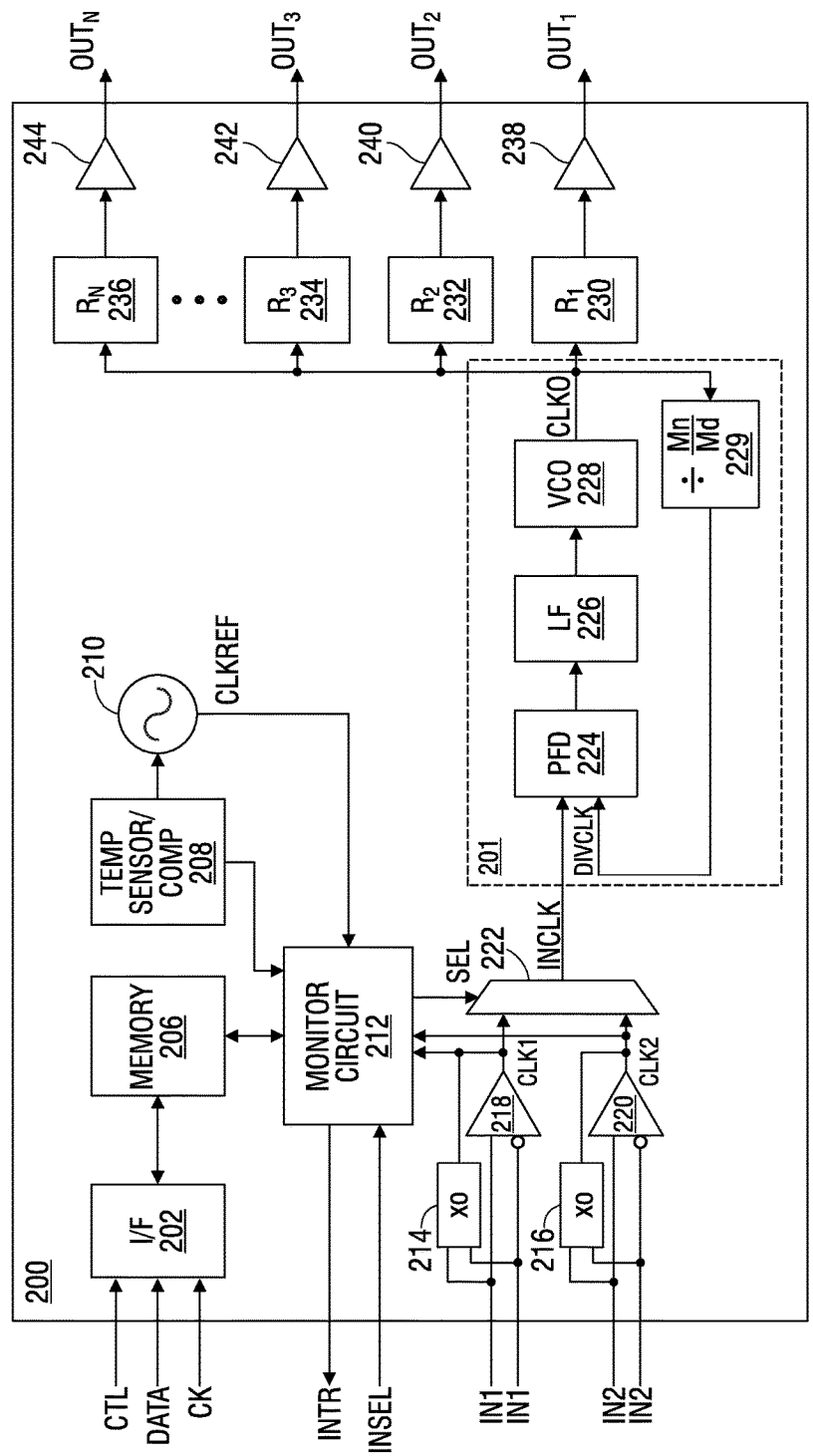
FIG. 1 illustrates a functional block diagram of an exemplary fail safe clock buffer and clock generator including monitor circuitry consistent with at least one embodiment of the invention.

Referring to FIG. 1, integrated circuit 200 includes phase-locked loop (PLL) 201 that receives input clock signal INCLK for use by PLL 201 to generate output clock signal CLKO. Input clock signal INCLK is based on either external input clock signal IN1 or external input clock signal IN2, which may be selected as the input clock signal by select circuit 222 according to select signal SEL. In at least one embodiment of integrated circuit 200, external input clock signals IN1 and IN2 have substantially the same frequency although they may have a static frequency offset between them. For example, the frequency difference between external input clock signals IN1 and IN2 may be less than 100 ppm. However, the external input clock signals IN1 and IN2 may have an arbitrary phase relationship, i.e., a particular edge (e.g., rising or falling) of the input clock signals are separated by an arbitrary delay. This arbitrary phase relationship may result in a phase offset. In some embodiments of integrated circuit 200, external input clock signals IN1 and IN2 have frequencies that differ by a ratio and one or more frequency divider circuits are included, e.g., between one or more of buffers 218 and 220 and select circuit 222, to generate input clock signals CLK1 and CLK2 having substantially same frequencies.

Figure 6:
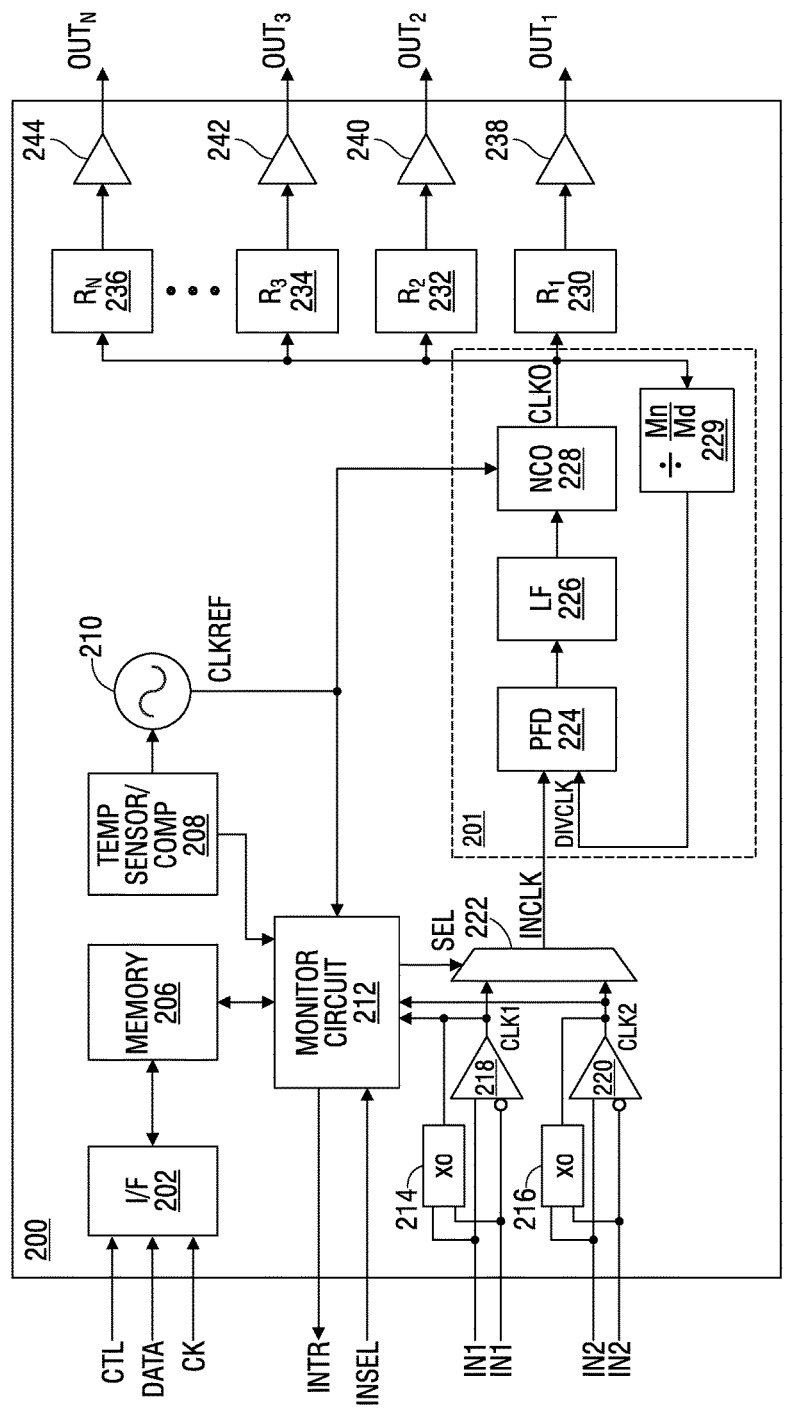
FIG. 6 illustrates a functional block diagram of an exemplary fail safe clock buffer and clock generator including monitor circuitry consistent with at least one embodiment of the invention.

In at least one embodiment of integrated circuit 200, phase-locked loop 201 is a fractional-N PLL, i.e., frequency $f_{REF}$ of input clock signal INCLK can be multiplied by a rational number to supply a wide variety of output frequencies. The fractional-N loop can be viewed as a digitally controlled oscillator providing an output clock signal CLKO having an output frequency controlled by a rational digital number R according to $f_{OUT}=R \times f_{REF}$. Thus, PLL 201 can provide a wide range of output frequencies. The precision of R may be a few parts per billion. The precision of R in combination with voltage controlled oscillator 228 that can provide a signal having an output frequency range of approximately +/−10%, may result in a PLL that provides an "any rate" frequency relationship between the frequency of the input clock signal INCLK and the frequency of the output clock signal CLKO. Voltage controlled oscillator 228 generates output clock signal CLKO responsive to an analog voltage. Instead of voltage controlled oscillator 228, PLL 201 may generate output clock signal CLKO using a digitally controlled oscillator responsive to a digital control word. In other embodiments of PLL 201 a numerically controlled oscillator generates output clock signal CLKO based on reference clock signal CLKREF, as illustrated in FIG. 6.

Referring back to FIG. 1, fractional feedback divider 229 generates a feedback signal based on a target divider ratio Mn/Md using any suitable technique. The target divider ratio may be fixed or predetermined based on contents of a corresponding storage element (not shown) or a corresponding entry in memory 206. Fractional-N phase-locked loops (PLLs) allow the multiplication of the input clock signal by a rational number rather than an integer number as is common in traditional PLL designs. Such a multiplication may use a multi-modulus divider in the feedback path. A multi-modulus divider will divide not by a fixed integer, but by a sequence of integers that over time approximates the rational number desired. This sequence may be generated by a digital delta-sigma modulator which shapes the quantization noise added to the rational number with a high pass filter. Thus, the resulting phase noise is also shaped by a high pass filter. The overall noise contribution from the fractional PLL depends on several factors. One factor is the update rate of the PLL (generally rate of input clock signal INCLK) in relation to the loop bandwidth of the PLL, a measure similar to the oversampling ratio in delta-sigma analog-to-digital converters. A higher oversampling ratio allows for better suppression of quantization noise in a frequency band of interest. For a given update rate, the noise contribution can be reduced by lowering the loop bandwidth. Another factor contributing to noise is the quantization error applied at the divider.

Phase-locked loop 201 includes phase/frequency detector 224 that detects a phase difference between a feedback signal and input clock signal INCLK. Target jitter performance of the loop may be facilitated by implementation of loop filter 226 as a digital filter, which is a technique that allows an accurate implementation of the loop filter that is properly matched to the corners and the order of the noise shaping function and therefore can reduce the jitter contribution from that source. The output of loop filter 226 drives voltage controlled oscillator 228.

A conventional line card may compare a received clock signal to a local reference signal that is generated externally using an external crystal or other local reference clock generator. However, use of such external reference clock generators increase cost and area and may have reliability issues. In contrast to conventional techniques, oscillator 210 may be included in integrated circuit 200 and may be any low-cost oscillator (e.g., microelectro-mechanical system (MEMS) oscillator, an LC oscillator, an RC oscillator, or a ring oscillator). Temperature sensor and compensator 208 may be integrated with oscillator 210. Active digital temperature compensation may also be applied within the frequency-to-digital converter to correct variation in raw frequency measurements due to temperature variation. For example, passive temperature sensor and compensation techniques include a passive circuit portion coupled in parallel with an LC oscillator. The passive circuit portion has a temperature sensitivity that opposes a temperature sensitivity of the LC oscillator. Passive temperature compensation techniques are described in U.S. patent application Ser. No. 12/145,647, filed Jun. 25, 2008, entitled "Passive Temperature Compensation for an Oscillator," naming Jeffrey L. Sonntag as inventor, now U.S. Pat. No. 7,777,585, issued Aug. 17, 2010, which application is incorporated herein by reference.

Temperature sensor and compensator 208 may include a separate temperature sensor proximate to oscillator 210 and/or in thermal contact with oscillator 210 and a compensation circuit configured to generate a compensation signal based on a signal indicative of temperatures sensed by temperature sensor. The separate temperature sensor provides temperature change information to a compensation circuit that generates one or more control signals for a frequency-to-digital converter to generate a temperature compensated digital frequency value corresponding to input clock signal CLK1. Such embodiments may further improve the accuracy of frequency deviation detection described herein as compared to the passive temperature compensation techniques described above.

In at least one embodiment of integrated circuit 200, input clock signals CLK1 and CLK2 are based on external input clock signals IN1 and IN2, which are received by integrated circuit 200. External input clock signals IN1 and IN2 may be buffered and converted to single-ended signals using buffers 218 and 220, respectively, and/or frequency divided by divider circuits (not shown), to generate input clock signals CLK1 and CLK2, which have substantially the same frequency. Although external input clock signals IN1 and IN2 may have substantially the same frequency, in at least one embodiment of integrated circuit 200, the frequencies of external input clock signals IN1 and IN2 are different multiples of a target frequency for input clock signals CLK1 and CLK2 and any divider circuits used to generate CLK1 and CLK2 may have different divide ratios, accordingly.

In at least one embodiment of integrated circuit 200, individual ones of external input clock signals IN1 and IN2 may have a wide range of frequencies and the output clock signal may have a wide range of frequencies, i.e., the ranges of frequencies may span many orders of magnitude. In at least one embodiment of the invention, PLL 201 is configured based on at least a frequency specified for the input clock signals CLK1 and CLK2 and a loop bandwidth specified for PLL 201. In at least one embodiment of integrated circuit 200, PLL 201 is configured based on parameters received from off-chip via interface 202 and/or from memory 206. Integrated circuit 200 may receive the specified frequency and specified bandwidth from off-chip and configure PLL 201 based on parameters stored in a configuration table in memory 206 corresponding to the specified frequency and specified bandwidth. In an exemplary embodiment, integrated circuit 200 may receive external input clock signals IN1 and IN2 having frequencies that range from approximately 1 kHz to approximately 710 MHz, and output clock signal CLKO may range from approximately 1 kHz to approximately 2 GHz. Output signal CLKO may be frequency divided by circuits 230, 232, 234, and 236 to generate output clock signals OUT1, OUT2, OUT3, and OUTN. Circuits 230, 232, 234, and 236 may include fractional dividers or integer dividers. Output buffers 238, 240, 242, and 244 may generate output clock signals OUT1, OUT2, OUT3, and OUTN according to a target signal format (e.g., OUT1, OUT2, OUT3, and OUTN may be single-ended or differential and may comply with one or more signaling standards, e.g., low-voltage positive emitter-coupled logic (LVPECL), low-power, low-voltage positive emitter-coupled logic (low-power LVPECL), low-voltage differential signaling (LVDS), current-mode logic (CML), or complementary metal-oxide semiconductor (CMOS) signaling standards) to drive a particular load.

In a least one embodiment, monitor circuit 212 receives only one clock signal (e.g., only one of input clock signals CLK1 and CLK2). Monitor circuit 212 generates an alarm signal to indicate one or more of LOS or OOR conditions and provides the alarm signal externally using interrupt signal INTR. In other embodiments, monitor circuit 212 generates the alarm signal based on both input clock signals CLK1 and CLK2, or even further additional input clock signals. Monitor circuit 212 may generate a select signal that controls select circuit 222 to switch from a first, failing reference signal, input clock signal CLK1, to a backup reference signal, input clock signal CLK2, accordingly. Any suitable clock switching techniques may be used.

Figure 2:
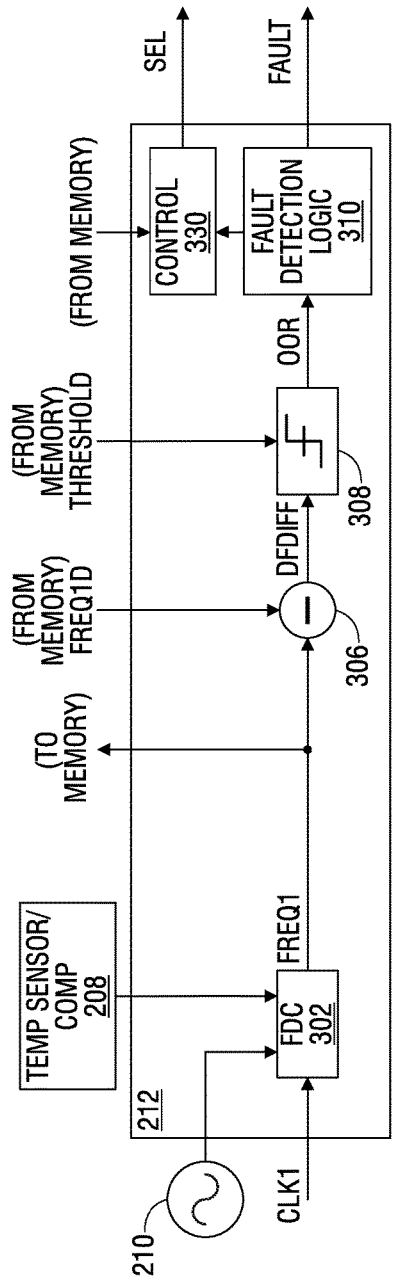
FIG. 2 illustrates a functional block diagram of a portion of monitor circuitry of FIG. 1 generating fault information based on one external input clock signal consistent with at least one embodiment of the invention.

Referring to FIG. 2, in at least one embodiment, monitor circuit 212 converts the frequency of input clock signal CLK1 into a digital frequency value relative to the short-term stable reference frequency provided by oscillator 210, e.g., digital input frequency FREQ1, using frequency-to-digital converter 302. In general, the short-term stable reference frequency provided by oscillator 210 is substantially greater than (e.g., at least an order of magnitude greater than) the frequency of input clock CLK1. Frequency-to-digital converter 302 receives a digital sensed temperature signal from temperature sensor and compensator 208 and compensates a digital frequency value for input CLK 1 accordingly to generate digital input frequency FREQ1. By comparing digital input frequency FREQ1 to a prior digital input frequency value FREQ1D retrieved from memory 206, monitor circuit 212 may detect a loss of signal condition or substantial change of frequency condition (i.e., a change to a frequency that is outside the target range). Monitor circuit 212 may store each digital value of digital input frequency FREQ1 in memory for use later as a prior digital input frequency value FREQ1D, and compares digital input frequency value FREQ1 to prior digital input frequency value FREQ1D retrieved from memory 206. The interval over which frequency change may be detected varies according to the size of the memory buffer and the update rate. Monitor circuit 212 may compare digital input frequency value FREQ1 and a prior digital input frequency value FREQ1D by determining the difference between those values, e.g., using difference circuit 306 to generate a digital change in frequency value DFDIFF. Comparator 308 compares the digital change in frequency value DFDIFF to threshold frequency difference value THRESHOLD to determine whether DFDIFF is out-of-range. Threshold frequency difference value THRESHOLD may be based on a relative specification (e.g., 50 ppm/s, 10 ppm/s, or 1 ppm/s) and an actual value may be based on a digital representation of the actual frequency of input clock signal CLK1. If the comparison indicates that digital change in frequency value DFDIFF exceeds threshold frequency difference value THRESHOLD, comparator 308 sets out-of-range indicator OOR. Otherwise comparator 308 resets out-of-range indicator OOR. Fault detection logic 310 may determine how many comparisons resulting in an out-of-range indicator are set over a predetermined interval, how long the out-of-range indicator remains set, or other suitable metric, and generates fault indicator FAULT accordingly. An exemplary fault may be detected if a frequency change of 10 ppm or more occurs during an interval of 10 seconds.

Figure 3:
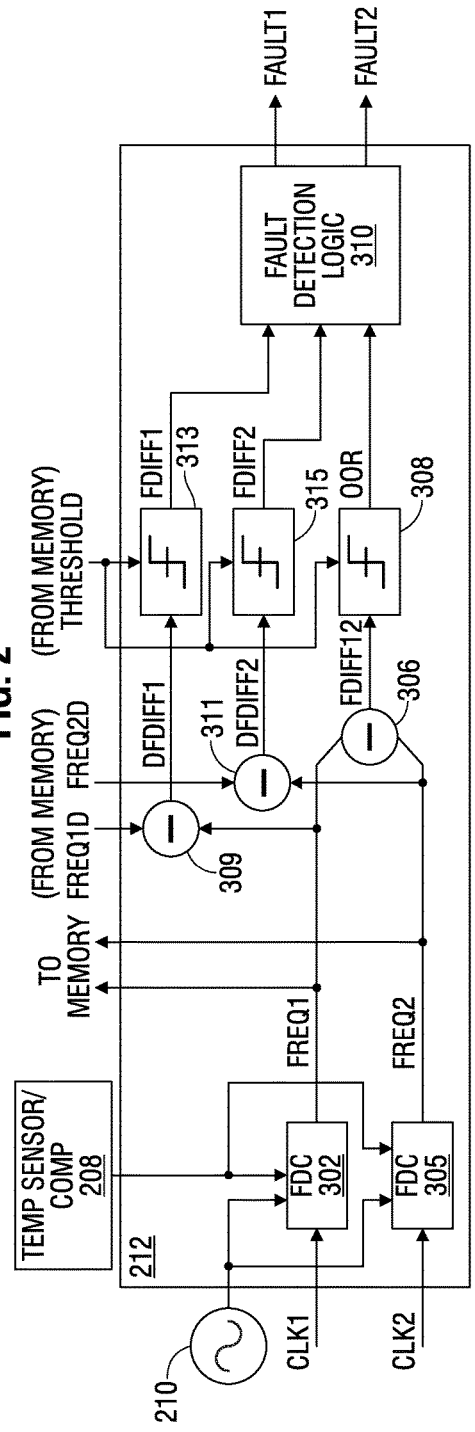
FIG. 3 illustrates a functional block diagram of a portion of a monitor circuitry of FIG. 1 generating fault information based on two external input clock signals consistent with at least one embodiment of the invention.

Referring to FIG. 3, rather than rely on a prior determined digital input frequency value stored in memory, monitor circuit 212 may use input clock signal CLK2 to detect LOS or OOR conditions in input clock signal CLK1. Monitor circuit 212 converts the frequency of input clock signal CLK1 relative to the short-term stable reference frequency provided by oscillator 210 and the frequency of input clock signal CLK2 relative to the short-term stable reference frequency provided by oscillator 210 into digital input frequency FREQ1 and digital input frequency FREQ2, respectively, using frequency-to-digital converters 302 and 305, respectively. In general, the short-term stable reference frequency provided by oscillator 210 is substantially greater than the frequency of input clock CLK1 and is substantially greater than the frequency of input clock CLK2. When digital input frequency FREQ1 and digital input frequency FREQ2 are within a target range, the difference between those digital input frequency values generated by difference circuit 306, digital frequency difference value FDIFF12, is within a target range below threshold frequency difference value THRESHOLD. By comparing the digital frequency difference value FDIFF12 to threshold frequency difference value THRESHOLD by comparator 308, monitor circuit 212 may detect an LOS or OOR condition. For example, comparator 308 sets out-of-range indicator OOR, when the digital frequency difference value FDIFF12 exceeds threshold frequency difference value THRESHOLD received from memory. Otherwise, comparator 308 resets out-of-range indicator OOR.

In addition to determining the difference between digital input frequency FREQ1 and digital input frequency FREQ2 to determine an out-of-range condition, monitor circuit 212 may determine which input clock signal is out-of-range based on comparison of digital input frequency FREQ1 to a prior digital input frequency value FREQ1D retrieved from memory 206 and comparison of digital input frequency FREQ2 to a prior digital input frequency value FREQ2D retrieved from memory 206. For example, monitor circuit 212 compares digital input frequency value FREQ1 and a prior digital input frequency value FREQ1D by determining the difference between those values, e.g., using difference circuit 309 to generate a digital change in frequency value DFDIFF1. Comparator 313 compares the digital change in frequency value DFDIFF1 to threshold frequency difference value THRESHOLD to determine whether DFDIFF1 is out-of-range. Similarly, monitor circuit 212 compares digital input frequency value FREQ2 and a prior digital input frequency value FREQ2D by determining the difference between those values, e.g., using difference circuit 311 to generate a digital change in frequency value DFDIFF2. Comparator 315 compares the digital change in frequency value DFDIFF2 to threshold frequency difference value THRESHOLD to determine whether DFDIFF2 is out-of-range.

Fault detection logic 310 may determine how many of each comparison results in an out-of-range indicator being set or how long the out-of-range indicator remains set and may determine which input clock signal is faulty. Fault detection logic 310 generates fault indicator FAULT1 in response to input clock signal CLK1 being out-of-range for at least a predetermined amount of time or a predetermined number of qualification windows in which the out-of-range indicator is set. Fault detection logic 310 generates fault indicator FAULT2 in response to input clock signal CLK2 being out-of-range for at least a predetermined amount of time or a predetermined number of qualification windows in which the out-of-range indicator is set. In at least one embodiment, fault detection logic 310 implements a leaky bucket algorithm based on out-of-range indicator OOR and sets fault indicator FAULT1 and fault indicator FAULT2 accordingly.

Figure 4:
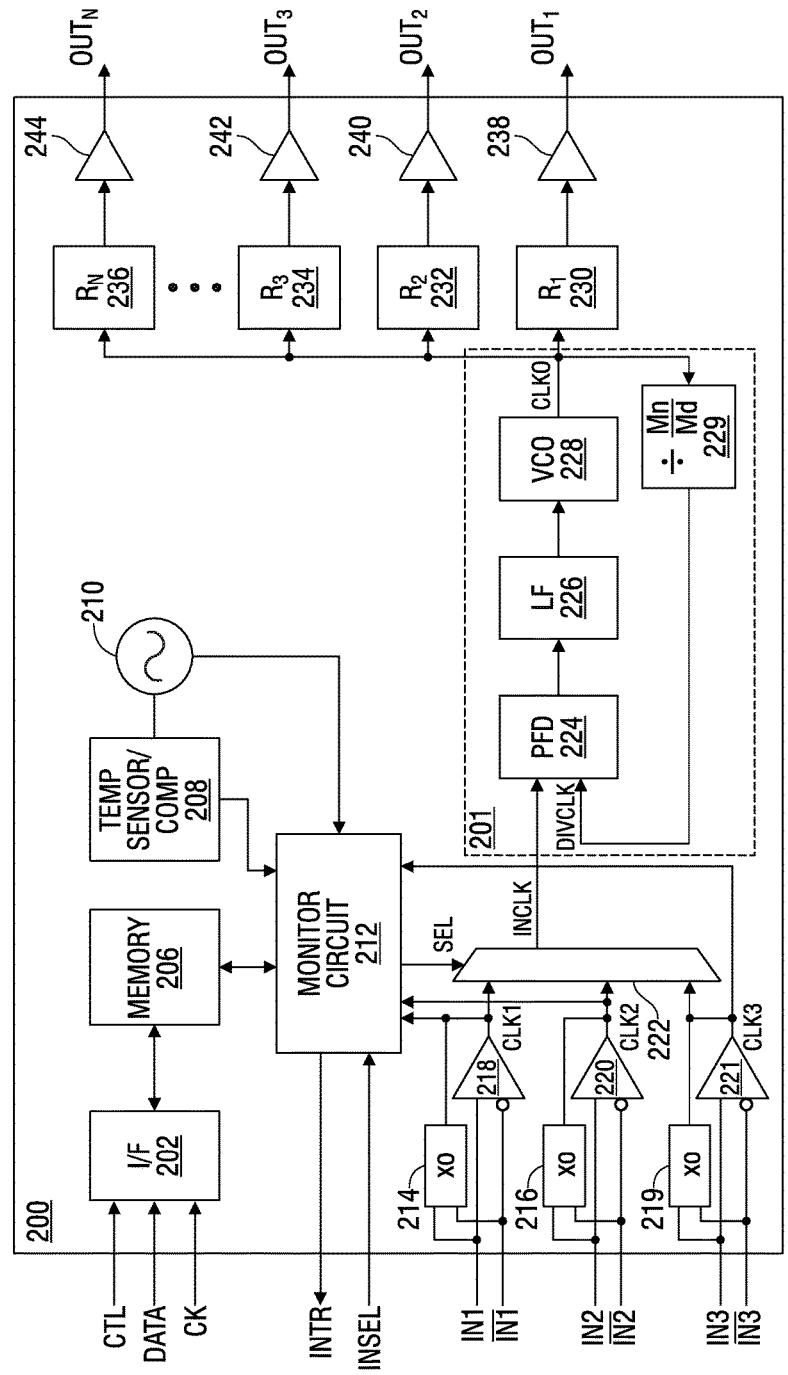
FIG. 4 illustrates a functional block diagram of an exemplary fail safe clock buffer and clock generator including monitor circuitry responsive to more than two external input clock signals consistent with at least one embodiment of the invention.

In at least one embodiment, integrated circuit 200 receives an additional external input clock signal that may be used to detect a fault condition and determine whether external input clock signal IN1 or a backup clock signal (e.g., external input clock signal IN2) has failed. Referring to FIGS. 4 and 5, integrated circuit 200 receives external input clock signals IN1, IN2, and IN3 from separate external sources and generates input clock signals CLK1, CLK2, and CLK3, respectively, using crystal oscillator circuits 214, 216, and 219, respectively, and corresponding buffers 218, 220, and 221, respectively. Monitor circuit 212 receives input clock signals CLK1, CLK2, and CLK3, and generates corresponding digital frequency values FREQ1, FREQ2, and FREQ3 indicating respective digital frequency values relative to the short-term stable reference frequency provided by oscillator 210, using respective frequency-to-digital converters 302, 305, and 307. When digital frequency difference values FREQ1, FREQ2, and FREQ3 are each within a target range, the relative difference between digital frequency difference values generated by difference circuits 306, 317, and 319, relative difference in frequency values FDIFF12, FDIFF23, and FDIFF13 are each also within a target range. By comparing each of the relative difference in frequency values FDIFF12, FDIFF23, and FDIFF13 to threshold frequency difference value THRESHOLD by comparators 308, 320, and 322, respectively, monitor circuit 212 may detect a loss-of-signal condition or out-of-frequency condition.

For example, comparators 308, 320, and 322 each set a corresponding out-of-range indicator OOR, when the corresponding relative difference in frequency difference value FDIFF12, FDIFF23, or FDIFF13 exceeds threshold frequency difference value THRESHOLD received from memory 206. Otherwise comparators 308, 320, and 322 each reset the corresponding out-of-range indicator OOR12, OOR23, or OOR13. Fault detection logic 310 may each count how many comparisons result in the corresponding out-of-range indicator being set or how long the corresponding out-of-range indicator remains set and generates fault indicator FAULT in response to one or more of the clock signals being out-of-range for at least a predetermined amount of time or a predetermined number of out-of-range intervals. Control logic 330 may determine which of external input clock signals IN1 and IN2 has failed based on information received from fault detection logic 310 and may set the select signal SEL to switch between external input clock signals IN1, IN2, and IN3 accordingly. If multiple input clock signals have changed, control circuit 330 may further use prior values of frequency difference values FDIFF12, FDIFF23, and FDIFF13 stored in memory to identify the input clock signals that have changed. Note that the logic illustrated for monitor circuit 212 in FIGS. 2, 3, and 5 is exemplary and other logic may be used to implement functions of the monitor circuit 212.

An exemplary frequency-to-digital converter that may be included by any of frequency-to-digital converters 302, 305, or 307 to generate FREQ1, FREQ2, or FREQ3, respectively, of FIGS. 2, 3, and 5 is illustrated in FIG. 7. Frequency-to-digital converter 702 receives an oscillating signal that has frequency $F_{OSC}(T)$, which is a frequency that varies with temperature. In addition, frequency-to-digital converter 702 receives a digital sensed temperature signal from temperature sensor 708, which may be integrated with frequency-to-digital converter 702 or may be external to frequency-to-digital converter 702. Relative frequency measurement circuit 704, which may include a frequency counter circuit, generates a digital frequency ratio of the frequency of input clock CLK to frequency $F_{OSC}(T)$. Temperature compensation circuit 706 adjusts that frequency ratio according to the digital sensed temperature signal using one or more predetermined coefficients stored in memory to generate the digital frequency value DFREQ. The one or more predetermined coefficients describe an inverse of a relationship between temperature and a corresponding frequency $F_{OSC}$. The one or more predetermined coefficients are generated and stored in memory during production test based on the relationship, which is also determined during production test.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which PLL 201 and output dividers 230, 232, 234, and 236 provide a particular clock synthesizer architecture, one of skill in the art will appreciate that the teachings herein can be utilized with other clock synthesizer architectures. Variations and modifications of the embodiments disclosed herein, may be made based on the description set forth herein, without departing from the scope and spirit of the invention as set forth in the following claims.

What is claimed is:

1. A fail safe clock generator comprising:
an oscillator circuit configured to generate a clock signal having a short-term stable reference frequency; and
a monitor circuit comprising:
a frequency-to-digital converter configured to generate a first digital frequency value representing a first frequency of a first input clock signal relative to the short-term stable reference frequency;
a circuit configured to provide a second digital frequency value representing a second frequency relative to the short-term stable reference frequency; and
a logic circuit configured to generate a fault detection signal based on a difference between the first digital frequency value and the second digital frequency value,
wherein the fail safe clock generator provides an output clock signal based on the difference.

2. The fail safe clock generator, as recited in claim 1, wherein the circuit comprises a memory circuit storing a prior first digital frequency value, the second digital frequency value is the prior first digital frequency value, and the second frequency is a prior frequency of the first input clock signal relative to the short-term stable reference frequency.

3. The fail safe clock generator, as recited in claim 1, wherein the circuit comprises:
a second frequency-to-digital converter configured to generate the second digital frequency value representing the second frequency relative to the short-term stable reference frequency, the second frequency corresponding to a second input clock signal.

4. The fail safe clock generator, as recited in claim 3, wherein the monitor circuit further comprises:
a third frequency-to-digital converter configured to generate a third digital frequency value representing a third frequency of a third input clock signal relative to the short-term stable reference frequency, the fault detection signal being further based on the third digital frequency value.

5. The fail safe clock generator, as recited in claim 4, wherein the first input clock signal or the second input clock signal is identified as a faulty clock signal based on the first digital frequency value, the second digital frequency value, and the third digital frequency value.

6. The fail safe clock generator, as recited in claim 1, wherein the frequency-to-digital converter generates the first digital frequency value based on the first input clock signal, the clock signal having the short-term stable reference frequency, and a digital sensed temperature value.

7. The fail safe clock generator, as recited in claim 1, further comprising:
a phase-locked loop configured to generate the output clock signal based on an input signal; and
a select circuit responsive to a select signal to select between the first input clock signal and a second input clock signal to be provided as the input signal,
wherein the monitor circuit is further configured to generate the select signal based on the difference, the select signal being configured to select the first input clock signal or the second input clock signal to generate the output clock signal.

8. The fail safe clock generator, as recited in claim 1, wherein the first input clock signal or a second input clock signal is identified as a faulty clock according to a predetermined difference magnitude threshold value or a predetermined qualification window.

9. The fail safe clock generator, as recited in claim 1, wherein the monitor circuit further comprises a temperature compensation circuit configured to temperature compensate a relative frequency measurement of the first frequency of the first input clock signal relative to the short-term stable reference frequency based on a digital sensed temperature and predetermined temperature coefficients describing a relationship between temperature and a corresponding frequency of the clock signal.

10. The fail safe clock generator, as recited in claim 1, wherein the oscillator circuit is a temperature-compensated LC oscillator comprising a passive temperature compensation circuit configured to provide temperature compensation to the temperature-compensated LC oscillator in response to a change in temperature.

11. A method comprising:
generating a clock signal having a short-term stable reference frequency;

generating a first digital frequency value representing a first frequency of a first input clock signal relative to the short-term stable reference frequency;

providing a second digital frequency value representing a second frequency relative to the short-term stable reference frequency;

generating a fault detection signal based on a difference between the first digital frequency value and the second digital frequency value; and providing an output clock signal based on the difference.

12. The method, as recited in claim 11, wherein providing the second digital frequency value comprises:

retrieving from memory a prior first digital frequency value, the prior first digital frequency value being provided as the second digital frequency value, and the second frequency being a prior frequency of the first input clock signal relative to the short-term stable reference frequency.

13. The method, as recited in claim 11, wherein providing the second digital frequency value comprises:

generating the second digital frequency value representing the second frequency relative to the short-term stable reference frequency, the second frequency corresponding to a second input clock signal.

14. The method, as recited in claim 13, further comprising:

generating a third digital frequency value representing a third frequency of a third input clock signal relative to the short-term stable reference frequency, the fault detection signal being further based on the third digital frequency value.

15. The method, as recited in claim 11, wherein generating the fault detection signal is further based on a predetermined difference magnitude threshold value or a predetermined qualification window.

16. The method, as recited in claim 11, further comprising:

generating the output clock signal based on an input signal and a feedback clock signal; and selecting between the first input clock signal and a second input clock signal to be provided as the input signal in response to the fault detection signal.

17. The method, as recited in claim 11, further comprising:

generating a digital sensed temperature value indicative of a temperature of an oscillator used to generate the clock signal, wherein the first digital frequency value is generated based on the first input clock signal, the clock signal having the short-term stable reference frequency, and the digital sensed temperature value.

18. The method, as recited in claim 11, further comprising:

sensing a temperature of an LC oscillator used to generate the clock signal; and passively compensating for variations due to changes in the temperature of the LC oscillator.

19. The method, as recited in claim 11, further comprising:

sensing a temperature of an oscillator used to generate the clock signal, wherein generating the first digital frequency value includes compensating a relative frequency measurement of the first frequency of the first input clock signal relative to the short-term stable reference frequency based on the temperature and predetermined temperature coefficients describing a relationship between temperature and a corresponding frequency of the clock signal.

20. An apparatus comprising:

means for generating a clock signal having a short-term stable reference frequency;

means for generating a first digital frequency value representing a first frequency of a first input clock signal relative to the short-term stable reference frequency;

means for providing a second digital frequency value representing a second frequency relative to the short-term stable reference frequency;

means for generating a fault detection signal based on a difference between the first digital frequency value and the second digital frequency value; and means for providing an output clock signal based on the difference.

* * * * *